J. L. MUSSER.
METHOD OF TREATING CLAY.
APPLICATION FILED AUG. 31, 1911. RENEWED DEC. 12, 1914.
1,147,114.
Patented July 20, 1915.
3 SHEETS—SHEET 1.
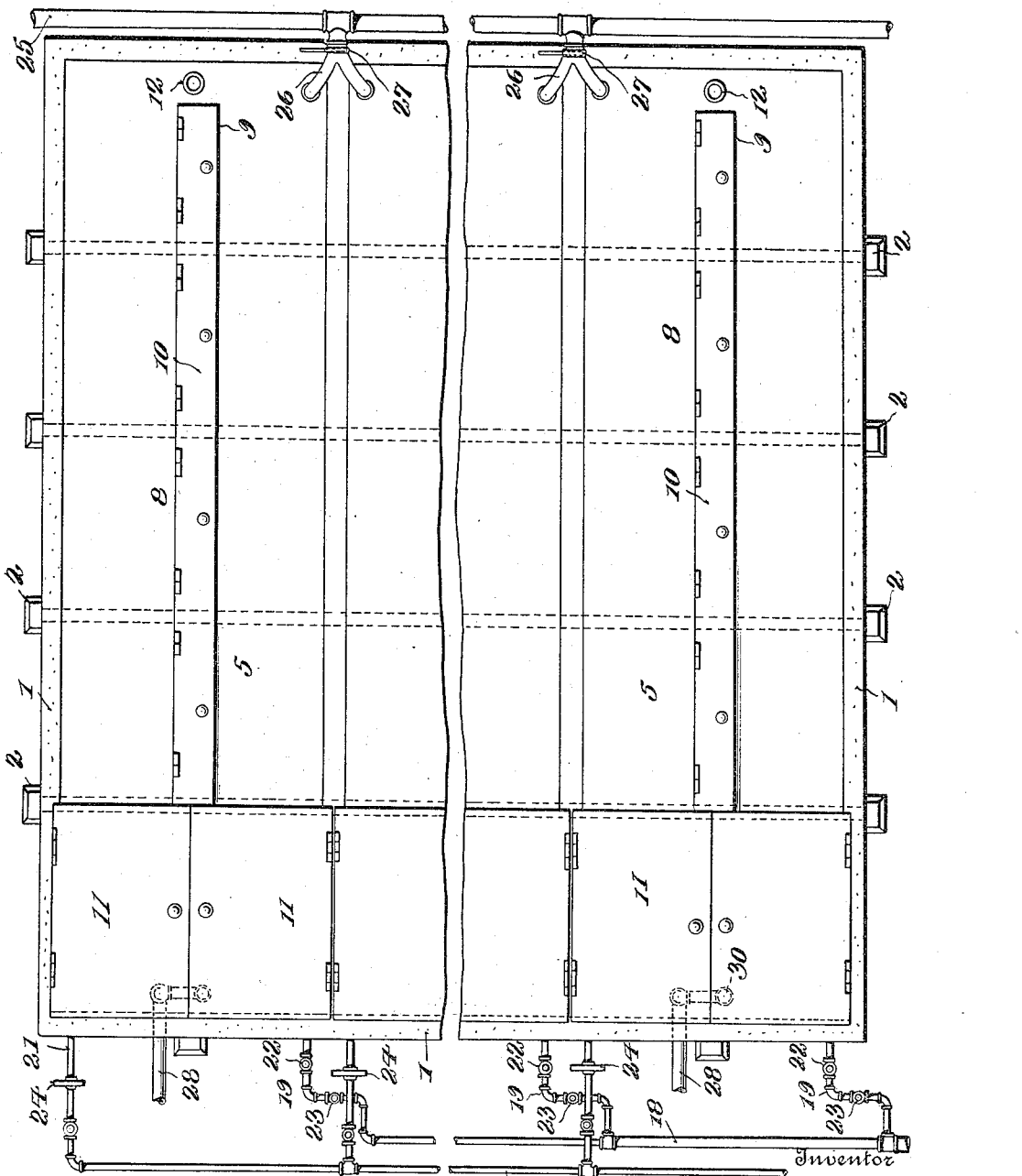

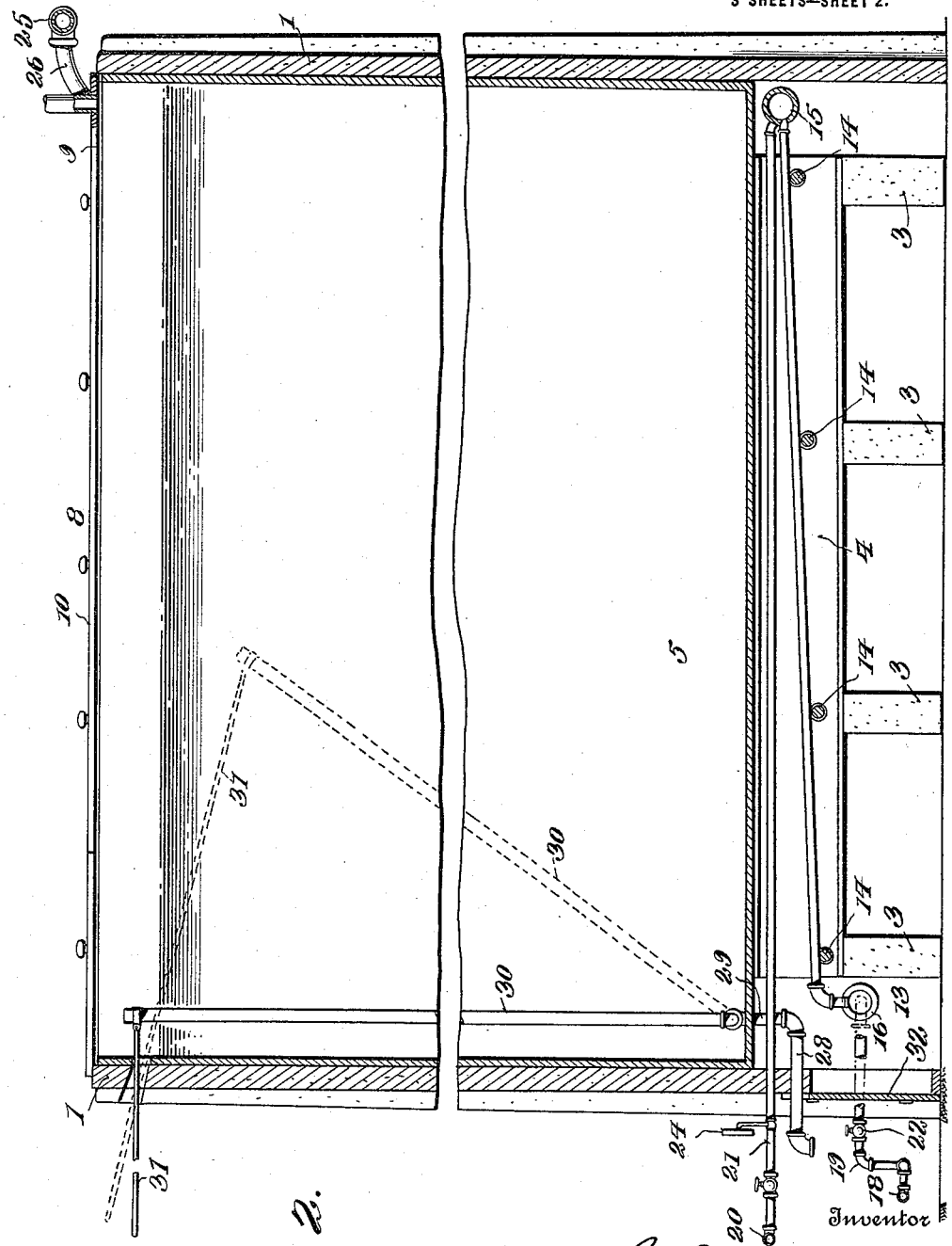

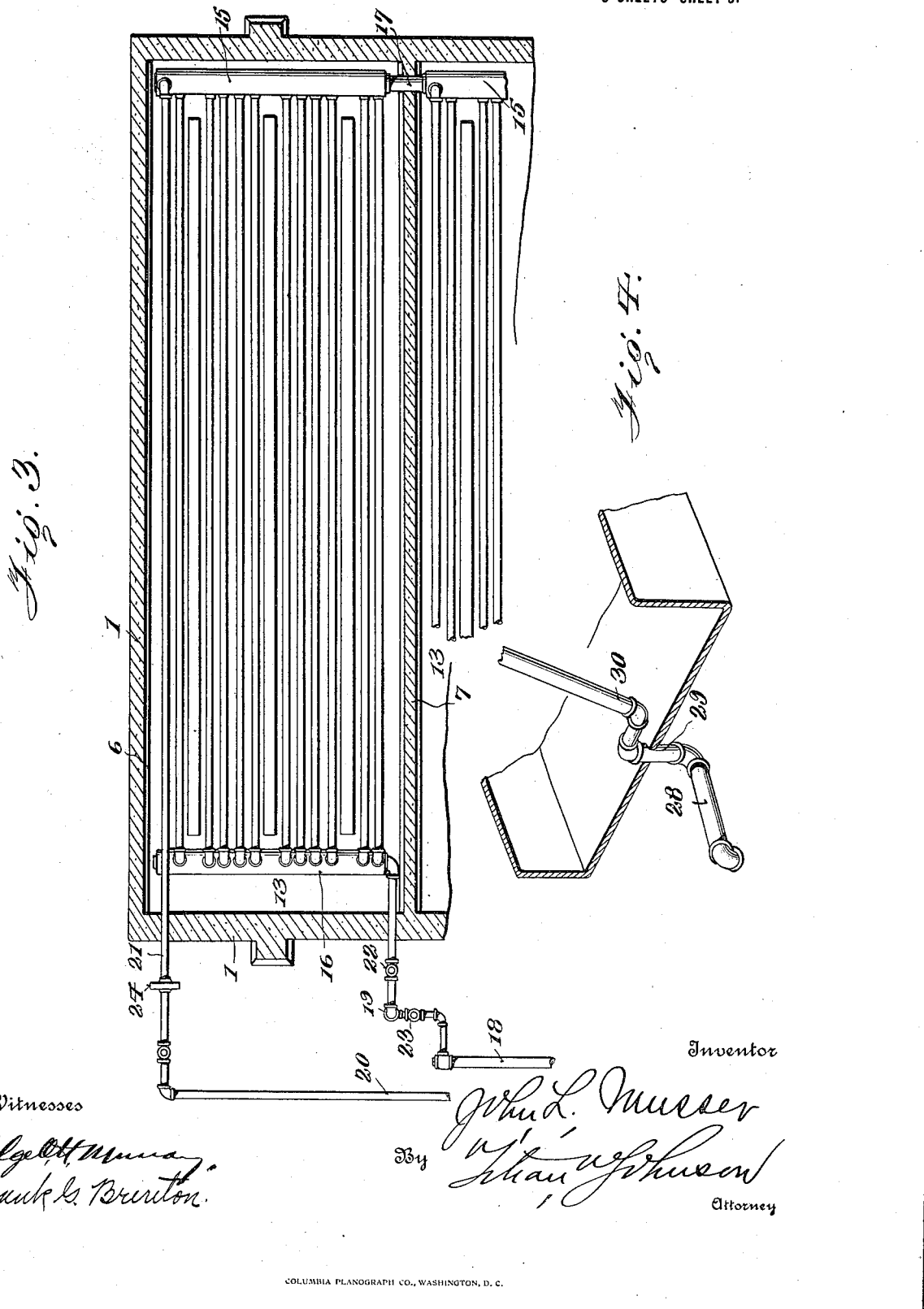

UNITED STATES PATENT OFFICE.

JOHN L. MUSSER, OF LANCASTER, PENNSYLVANIA.

METHOD OF TREATING CLAY.

1,147,114.  Specification of Letters Patent.  Patented July 20, 1915.

Application filed August 31, 1911, Serial No. 647,026. Renewed December 12, 1914. Serial No. 876,937.

*To all whom it may concern:*

Be it known that I, JOHN L. MUSSER, a citizen of the United States, residing at Lancaster, in the county of Lancaster and State of Pennsylvania, have invented certain new and useful Improvements in Methods of Treating Clay, of which the following is a specification.

The invention relates generally to the method of treating clay, but more particularly to the treatment of the clay after it has undergone the process commonly known as "floating" to free the clay from the heavier particles of impurity, that are of greater specific gravity than the clay, such as sand and grit, before reaching the tanks, or the beginning of my process, leaving the clay with vegetable matter and other impurities of lighter specific gravity than the clay, which is held in suspension, as it is introduced into the tanks, therefore one of the objects of my invention is to free previously floated clay of the vegetable matter and other impurities contained in the very small cells of the clay, and thereby produce at less cost, a more completely refined article than has heretofore been produced, and to this end the invention consists, first, in subjecting in a closed tank, clay in suspension to the action of heat at a temperature sufficiently high, according to the character and condition of the clay being treated, to cause the cells to expand and liberate the vegetable and other deleterious matter, of lighter specific gravity than the clay itself, contained therein; second, decanting off the light impurities; third, subjecting the heated pulp to reduced atmospheric and vapor pressure, and fourth, finally drying the resultant product.

In carrying out the process, I prefer to use an apparatus similar in construction to that illustrated in the accompanying drawings, in which—

Figure 1 is a top plan view, broken transversely; Fig. 2 is a vertical section, also broken; Fig. 3 is a top plan view of a heating device, arranged beneath one of the tanks or compartments, and Fig. 4 is a detail perspective of one of the drain-pipes, and connections.

Referring to the several views, the numeral 1 indicates the walls of a suitable structure, preferably concrete or cement, strengthened by vertical beams 2. Supported within the structure, upon piers 3 and I-beams 4, are a number of tanks 5, preferable metal, the outer edges of the two outer or end tanks being supported upon ledges 6, (only one being shown, Fig. 3) on the end walls of the structure. The spaces between the tanks are preferably filled with cement, forming walls 7. All of the tanks and the heating devices arranged beneath them are identical in construction, so that a description of a section of the apparatus, such as is illustrated in Fig. 3, in conjunction with the outside pipe-arrangement shown in Fig. 1, will suffice to clearly describe the apparatus as a whole.

Each tank is provided with a suitable cover 8 in which there is a longitudinal opening 9 of sufficient width to permit an operative to insert a suitable instrument to agitate the floating material within the tank, as may be required during the operation of the process, said opening being provided with a hinged cover 10. The remaining portion of each tank is provided with oppositely-hinged doors 11, through which access to the tank is had to permit the refined product to be removed. Each tank is provided with an inlet 12, through which the clay solution may be introduced into the tank.

A heating system divided into a number of sections 13, one section for each tank, is supported upon transverse rods 14, passing through openings in the respective I-beams, and the partition and end walls of the structure. The pipes of each section of the heating-system, which is preferably steam, are in communication with manifolds 15 and 16, manifold 15 being at a higher level than manifold 16, so that the pipes forming each section will be supported in a downwardly-inclined direction, as shown in Fig. 2, thus providing for proper drainage. The manifolds 15 of each adjacent tank are in communication with each other by nipples 17, and the manifolds 16, of the several sections, are connected with a return-pipe 18 by a valved-connection 19.

Steam from the main-feed pipe 20 is admitted to the first of the manifolds 15 through feed-pipe 21, and as all of the manifolds 15 are in communication with each other, by nipples 17, the steam will flow through the pipes forming each section and into the several manifolds 16, from which it will be conveyed to return-pipe 18 through connections 19, which are provided with cutoff valves 22, and check-valves 23 to prevent back pressure when a suction-pump is connected with the return-pipe 18. That portion of the connections 19, which is in direct communication with the manifolds 16 is of greater diameter than that portion of the connections which is in direct communication with the return-pipe 18, and the sections of the return-pipe between the several tanks also vary in diameter, beginning with an inch pipe and each section increasing in diameter throughout the whole system, so that the vacuum will be equalized throughout the entire number of tanks, and the same temperature maintained in each tank. A steam-gage 24 may be placed in each feed-pipe 20, so that the pressure in each heating section may be ascertained at a glance.

An exhaust-pipe 25 extends along the rear end of the battery of tanks, outside of the structure, and connected to said pipe, at suitable intervals, is a number of Y-connections 26, so arranged that the branches, which extend through packed openings in the covers 8, will draw from two adjacent tanks. Each Y-connection is provided with a slidable damper 27, by means of which communication between the tanks and the pipe 25 may be cut off, as for instance, when the apparatus was not working to its full capacity, or when several of the tanks, one or more, are out of commission.

Each tank is provided with a suitable drain-pipe 28, comprising a stationary or fixed part 29, and a movable part 30, the stationary part being fixed in the bottom of the tank and the movable part so arranged that it may be moved in the direction of the length of the tank so as to drain water and other matter at any level, after the clay has been precipitated. To the upper end of the pipe 30 is attached a rod 31, which, passing through the front wall of the structure, may be operated from the outside to manipulate the movable portion of the drain-pipe, as the water-level in the tank changes, the range of movement being such that the water is drained from the highest to the lowest level. The front wall, opposite each heating-section, is provided with a manhole 32, so that each section may be accessible for repairs and other purposes.

In practising my invention, the tanks being closed, the clay in suspension is introduced into the tanks through the inlet-openings 12; steam admitted to the heating system, and a suction-pump or fan (not shown) set in operation to remove the atmospheric pressure and moisture from the tanks through the Y-connections. A sufficient temperature is maintained under the several tanks for a length of time to insure a complete separation of the particles of clay and the liberation of the vegetable and other matter from the cells thereof, which float to the surface, leaving the clay precipitated, after which the water, together with all floating matter, is drawn off through the drain-pipe. The heat is maintained until the refined clay is sufficiently dry for handling, when the doors 11 are opened and the product removed by any suitable means.

Having thus described my invention, what I claim is:—

The process of treating clay, consisting in subjecting the clay pulp, after a preliminary decanting treatment to remove heavy impurities, to heat to expand the particles and free the light impurities, decanting off said light impurities and then subjecting the heated pulp to reduced atmospheric and vapor pressure, and finally drying the clay.

In testimony whereof I affix my signature in presence of two witnesses.

JOHN L. MUSSER.

Witnesses:
HESTER G. STONE,
FANNY MARKLY.

Copies of this patent may be obtained for five cents each, by addressing the "Commissioner of Patents, Washington, D. C."